(12) United States Patent
Muralidhar et al.

(10) Patent No.: US 10,977,322 B2
(45) Date of Patent: Apr. 13, 2021

(54) SYSTEMS AND METHODS FOR RECOMMENDING TEMPORALLY RELEVANT NEWS CONTENT USING IMPLICIT FEEDBACK DATA

(71) Applicant: WP Company LLC, Washington, DC (US)

(72) Inventors: Nikhil Muralidhar, Fairfax, VA (US); Eui-Hong (Sam) Han, Fairfax, VA (US); Huzefa Rangwala, Fairfax, VA (US)

(73) Assignee: WP Company, LLC, Washington, DC (US)

( * ) Notice: Subject to any disclaimer, the term of this patent is extended or adjusted under 35 U.S.C. 154(b) by 116 days.

(21) Appl. No.: 15/346,788

(22) Filed: Nov. 9, 2016

(65) Prior Publication Data
US 2017/0132230 A1    May 11, 2017

Related U.S. Application Data

(60) Provisional application No. 62/252,713, filed on Nov. 9, 2015.

(51) Int. Cl.
*G06F 16/00* (2019.01)
*G06F 16/9535* (2019.01)
*H04L 29/08* (2006.01)

(52) U.S. Cl.
CPC ........ *G06F 16/9535* (2019.01); *H04L 67/306* (2013.01)

(58) Field of Classification Search
CPC ........... G06F 17/30867; G06F 17/3053; G06F 17/30864; G06F 17/30699; G06F 17/30828; G06F 3/04842; G06F 16/9535
(Continued)

(56) References Cited

U.S. PATENT DOCUMENTS 8,412,699 B1 * 4/2013 Mukherjee ........ G06F 17/30395
707/713
8,442,929 B2 * 5/2013 Park ...................... G06Q 10/04
706/45

(Continued)

OTHER PUBLICATIONS

Spangher, "Building the Next New York Times Recommendation Engine" dated Aug. 11, 2015pp. 1-7; http://open.blogs.nytimes.com/2015/08/11/building-the-next-new-york-times-recommendation-engine/?_r=¹.

*Primary Examiner* — Michelle N Owyang
(74) *Attorney, Agent, or Firm* — Nixon & Vanderhye, P.C.

(57) ABSTRACT

Computer systems, methods and computer readable media storing instructions, for providing news item recommendations are disclosed. An example system includes one or more digital memories having stored therein metadata for a plurality of news items and click data corresponding to user interactions with the plurality of news items, and a processor. The processor is configured to: determine a user profile for a user, the user profile including indications of news items previously clicked on by the user; select candidate news items for recommendation from (a) said news items based upon respective similarity distances to news items included in the user profile or (b) news items included in other user profiles that are identified based upon their respective similarity distances to the user profiles; and score the candidate news items using, at least in part, a temporal aspect of the candidate news items.

12 Claims, 25 Drawing Sheets

(58) Field of Classification Search
USPC .................................................. 707/705–780
See application file for complete search history.

(56) References Cited

U.S. PATENT DOCUMENTS

| | | | | |
|---|---|---|---|---|
| 8,612,293 | B2* | 12/2013 | Benyamin | G06Q 30/0246 |
| | | | | 705/14.49 |
| 9,633,119 | B2* | 4/2017 | Wexler | G06F 17/30867 |
| 2005/0256756 | A1* | 11/2005 | Lam | G06Q 30/0202 |
| | | | | 705/7.33 |
| 2008/0319833 | A1* | 12/2008 | Svendsen | G06Q 30/02 |
| | | | | 705/7.29 |
| 2010/0088151 | A1* | 4/2010 | Kim | G06Q 30/02 |
| | | | | 705/7.29 |
| 2011/0202406 | A1* | 8/2011 | Suomela | G06Q 30/02 |
| | | | | 705/14.52 |
| 2012/0150626 | A1* | 6/2012 | Zhang | G06Q 30/0243 |
| | | | | 705/14.42 |
| 2013/0304731 | A1* | 11/2013 | Zheng | G06Q 30/0201 |
| | | | | 707/728 |
| 2013/0318014 | A1* | 11/2013 | Ismalon | G06F 17/30646 |
| | | | | 706/12 |
| 2014/0280214 | A1* | 9/2014 | Han | G06F 17/30943 |
| | | | | 707/748 |
| 2015/0248710 | A1* | 9/2015 | Medvedovsky | H04L 67/18 |
| | | | | 705/14.67 |
| 2016/0188725 | A1* | 6/2016 | Wang | G06F 16/9535 |
| | | | | 707/734 |
| 2017/0154112 | A1* | 6/2017 | Kermarrec | H04L 9/0643 |
| 2017/0310789 | A1* | 10/2017 | Thomee | H04L 51/32 |
| 2017/0330239 | A1* | 11/2017 | Luo | H04L 67/42 |

* cited by examiner

| User ID/Movie Name | Movie1 | Movie2 | Movie3 | Movie4 | Movie5 | Movie6 |
|---|---|---|---|---|---|---|
| U1 | 2.0 | 4.0 | 1.0 | ? | ? | ? |
| U2 | 4.0 | 1.0 | 4.5 | 4.0 | 1.5 | 0.5 |
| U3 | 2.0 | 5.0 | 1.5 | 2.0 | 4.5 | 5.0 |
| U4 | 3.0 | 2.5 | 3.5 | 3.5 | 2.5 | 3.0 |

FIG. 3A

| User ID/Movie Name | Movie1 | Movie2 | Movie3 | Movie4 | Movie5 | Movie6 |
|---|---|---|---|---|---|---|
| U1 | 2.0 | 4.0 | 1.0 | 2.0 | 4.5 | 5.0 |
| U2 | 4.0 | 1.0 | 4.5 | 4.0 | 1.5 | 0.5 |
| U3 | 2.0 | 5.0 | 1.5 | 2.0 | 4.5 | 5.0 |
| U4 | 3.0 | 2.5 | 3.5 | 3.5 | 2.5 | 3.0 |

FIG. 3B

| Movie Name | Movie4 | Movie5 | Movie6 |
|---|---|---|---|
| Movie1 | 0.9973 | 0.7792 | 0.6663 |
| Movie2 | 0.7054 | 0.9934 | 0.9929 |
| Movie3 | 0.9932 | 0.7039 | 0.5869 |

FIG. 4

| UserID/Movie Name | Movie 1 | Movie2 | Movie3 | Movie4 | Movie5 | Movie 6 |
|---|---|---|---|---|---|---|
| U1 | 2.0 | 4.0 | 1.0 | 0.993 | 3.974 | 3.972 |
| U2 | 4.0 | 1.0 | 4.5 | 4.0 | 1.5 | 0.5 |
| U3 | 2.0 | 5.0 | 1.5 | 2.0 | 4.5 | 5.0 |
| U4 | 3.0 | 2.5 | 3.5 | 3.5 | 2.5 | 3.0 |

FIG. 5

Data: $U, C \in \mathbb{R}^{n \times n}, P \in \mathbb{R}^{n \times 1}, U_{dict} \in \mathbb{R}^{m \times n}, y \in \mathbb{R}$
Result: $u_{keys}$ $U_{dict}$ = similarity($C_{j,i}$);

for $u_q$ in $U$ do
    $u_{keys}$ = getNN($U_{dict}, u_q, \sigma$);
    $u_{keys}$ = gather($u_{keys}, u_q, C, \beta, P$);
    return $u_{keys}$;
end

FIG. 6A

Function $getNN(U_{sim}, user, \alpha)$ : neighbors_list$_\alpha$ is
    neighbors_list$_{all}$ = sort($U_{sim}$[user_id], order=Ascending);
    neighbors_list$_\alpha$ = neighbors_list$_{all}$[:α];
    return neighbors_list$_\alpha$;
end Function $gather(u_{sim}, user, C, \beta, P)$ : recs$_\beta$ is
    recs$_a$ = { };
    recs = { };
    for neighbor in $a_{sim}$ do
        recs.extend(C[neighbor_id]);
    end
    recs = recs.difference(C[user_id]);
    recs$_\beta$ = score(recs, $\beta$, P);
    return recs$_\beta$;
end

FIG. 6B

Data: $U, C \in \mathbb{R}^{m \times n}, P \in \mathbb{R}^{n \times 1}, U_{dist} \in \mathbb{R}^{m \times 1}, \Gamma \in \mathbb{R}^{m \times n}, \Gamma_{user} \in \mathbb{R}^{m \times n}, \eta \in \mathbb{R}$
Result: $u_{i_{pass}}$ $U_{dist}$ = similarity($C, \rho$);

for $u_i$ in $U$ do
    $u_{i_{dist}}$ = getNN($U_{dist}, u_i, \alpha$);
    $u_{i_{pass}}$ = gather($u_{i_{dist}}, u_i, C, P, \beta, \Gamma, \Gamma_{user}, \gamma$);
    return $u_{i_{pass}}$;
end

FIG. 7A

```
Function getNN(U_dist, user, α) : neighborslist_α is
    neighborslist_all = sort(U_dist[user.idx].order=Ascending);
    neighborslist_α = neighborslist_all[:α]
    return neighborslist_α
end Function gather(u_rec, user, C, P, β, Γ, Γ_user, γ) : recs_β is
    recs_β = {};
    recs = {};
    for neighbor in u_rec do
        recs.extend(C[neighbor.idx]);
    end
    recs = recs.difference(C[user.idx]);
    //optional arguments indicated by [...] */;
    recs_β = scoreT*(recs, β, P, Γ, [Γ_user, user, γ]);
    return recs_β;
end
```

FIG. 7B

Data: $U, C \in \mathbb{R}^{n \times n}, U_{tag} \in \mathbb{R}^{m \times n}, P \in \mathbb{R}^{n \times 1}, U_{dist} \in \mathbb{R}^{m \times n}, \mu \in \mathbb{R}^{1}$
Result: $u_{i,recs}$ $U_{dist}$ = similarity($U_{tag}, \mu$);
for $u_i$ in U do
$\quad u_{i,nn}$ = getNN($U_{dist}, u_i, \sigma$);
$\quad u_{i,recs}$ = gather($u_{i,nn}, u_i, C, \beta, P$);
$\quad$ return $u_{i,recs}$;
end

FIG. 8

Data: $U, C \in \mathbb{R}^{m \times n}, C' \in \mathbb{R}^{n \times m}, P \in \mathbb{R}^{n \times 1}, L_{dist} \in \mathbb{R}^{n \times n}, \mu \in \mathbb{R}$
Result: $u_{k_{pos}}$ $L_{dist} = \text{similarity}(C', \rho)$;

for $u_i$ in $U$ do
    $u_{k_{nn}} = \text{getNN}(L_{dist}, u_i, \alpha)$;
    $u_{k_{pos}} = \text{gather}(u_{k_{nn}}, \beta, P)$;
    return $u_{k_{pos}}$;
end

FIG. 9A

Function $getNN(\mathbf{L}_{dist}, user, \alpha) : neighborslist_{all}$ is
  $neighborslist_{all} = [\,]$;
  for $a$ in $user\_profile$ do
    $new = \mathbf{L}_{dist}[a, idx].\text{difference}(user\_profile)$;
    $neighborslist_\alpha = \text{sort}(new, order=\text{Ascending})[:\alpha]$;
    $neighborslist_{all}.\text{extend}(neighborslist_\alpha)$;
  end
  return $neighborslist_{all}$;
end

Function $gather(recs, \beta, \mathbf{P}) : recs_{f_k}$ is
  $recs_{f_k} = [\,]$;
  $recs_{f_k} = \text{scoreC}(recs, \beta, \mathbf{P})$;
  return $recs_{f_k}$;
end

FIG. 9B

Data: $U, C \in \mathbb{B}^{n \times n}, C' \in \mathbb{B}^{n \times n}, P \in \mathbb{R}^{n \times l}, \Gamma_{item} \in \mathbb{R}^{n \times l}, \gamma \in \mathbb{R}, I_{dist} \in l$
Result: $u_{k_{pres}}$
$L_{dist}$ = similarity($C', \mu$);
for $u_k$ in $U$ do
    $u_{k_{pres}}$ = getNN($L_{dist}, u_k, \alpha$);
    $u_{k_{pres}}$ = gather($u_{k_{pres}}, \beta, P, \Gamma_{item}, \gamma$);
    return $u_{k_{pres}}$;
end

FIG. 10A function gather(recs, β, P, Γ_items, γ) : recs_fk is
    recs_fk = [];
    recs_fk = scoreΓ(recs, β, P, Γ_items, γ);
    return recs_fk
end

FIG. 10B

```
Function scoreT(r_i, β, P, Γ_{item}, γ): ad_recs_i is
    recs_i = {};
    for rec in r_i do
        Δ = γ - Γ_{item}[rec.idx];
        score = 1/(1+e^{-Δ}) * P[rec.idx];
        recs_i.append((rec, score));
    end
    ad_recs_i = sort(recs_i, sortby = score)[:β];
    return ad_recs_i
end
```

FIG. 11

```
Function scoreC(r_i, β, P): wt_recs_i is
    recs_i = [];
    for rec in r_i do
        score = P[rec.idx];
        recs_i.append((rec, score));
    end
    wt_recs_i = sort(recs_i, sortby = score)[:β];
    return wt_recs_i;
end
```

FIG. 12

Function $scoreT\_User(r_i, \beta, \mathbf{P}, \Gamma, \Gamma_{user})$: $wt\_recs_i$ is $recs_i = [\ ]$;
for $rec$ $in$ $r_i$ do
  $\Delta = \Gamma_{user}[rec.rn\_ida] - \Gamma[rec.ida][rec.ida]$;
  $score = \frac{1}{1+e^{-\Delta\beta}} * \mathbf{P}[rec.ida]$;
  $recs_i.append((rec, score))$;
end
$wt\_recs_i = \text{sort}(recs_i, sortby = score)[:\beta]$;
return $wt\_recs_i$
end

FIG. 13

Function $score T\_Client(\alpha, \beta, P, \Gamma, \Gamma_{user}, client)$: $ut\_recs_q$ is $recs_q = []$;
for $rec$ in $r_q$ do
$\quad \Delta = |\Gamma_{user}[client.id_q] - \Gamma[rec.m\_id_q][rec.id_q]|$;
$\quad score = \frac{1}{1+e^{-\alpha\Delta}} \times P[rec.id_q]$;
$\quad recs_q.append((rec, score))$;
end
$ut\_recs_q = sort(recs_q, sortby = score)[:\beta]$;
return $ut\_recs_q$
end

FIG. 14

Function $scoreT\_Global(r_i, \beta, P, \Gamma, \gamma)$: $wt\_recs_q$ is $recs_q = \{\}$;
for $rec$ in $r_q$ do
$\quad \Delta = \gamma - \Gamma[rec.nn\_idx][rec.idx]$;
$\quad score = \frac{1}{1+e^{-\Delta}} * P[rec.idx]$;
$\quad recs_q.append((rec, score))$;
end
$wt\_recs_q = \text{sort}(recs_q, sortby = score)[:\beta]$;
return $wt\_recs_q$
end

FIG. 15

| Sliding Window (days) | Avg. #of Users | Avg. #of Items | Avg. User Clicks | Avg. Item Clicks |
|---|---|---|---|---|
| 5 | 9032.6 | 1739.435 | 28.824 | 161.125 |
| 10 | 9764.075 | 2488.412 | 53.704 | 217.99 |
| 15 | 10348.773 | 3159.213 | 76.31 | 253.612 |
| 20 | 10926.285 | 3823.814 | 96.713 | 277.654 |
| 25 | 11538.107 | 4516.153 | 114.508 | 293.425 |
| 30 | 12218.683 | 5255.25 | 129.126 | 302.221 |

FIG. 16

| Month | #Users | #Items | #Clicks | #Avg Clicks Per User | #Avg Clicks Per Item | Dataset Density |
|---|---|---|---|---|---|---|
| January | 9747 | 3935 | 1572781 | 161.36 | 365.42 | 0.041 |
| February | 9766 | 3935 | 1513731 | 155 | 384.68 | 0.0394 |
| March | 9738 | 4173 | 1539296 | 158.07 | 368.87 | 0.0378 |
| April | 9817 | 4545 | 1705122 | 173.69 | 375.16 | 0.0382 |
| May | 9793 | 5036 | 1784848 | 182.26 | 354.42 | 0.0361 |
| June | 9927 | 5154 | 2046827 | 206.19 | 397.13 | 0.04 |
| July | 9939 | 5321 | 2259955 | 227.38 | 424.72 | 0.0427 |
| August | 9943 | 4916 | 2300532 | 231.37 | 467.97 | 0.047 |
| September | 9942 | 4726 | 2127412 | 213.98 | 450.15 | 0.0453 |
| October | 9867 | 4806 | 2126333 | 215.49 | 442.43 | 0.0448 |
| November | 9860 | 4170 | 1930306 | 195.77 | 462.90 | 0.0469 |
| December | 9842 | 4333 | 2078338 | 211.17 | 479.65 | 0.0487 |

FIG. 17

SYSTEMS AND METHODS FOR RECOMMENDING TEMPORALLY RELEVANT NEWS CONTENT USING IMPLICIT FEEDBACK DATA

CROSS REFERENCE TO RELATED APPLICATIONS

This applications claims priority from U.S. Provisional Patent Application No. 62/252,713 filed on Nov. 9, 2015, which is herein incorporated by reference in its entirety.

TECHNICAL FIELD

This disclosure generally relates to methods and systems for providing relevant news content to subscribers or users of a news service.

BACKGROUND

News has transformed primarily into a digital format with leading newspapers and news agencies having a significant online presence. The speed at which news reaches the reader notwithstanding, the proliferation of blogs and microblogs to deliver specialized content has become the order of the day.

Although a large amount of news content is being generated each day, only a subset of content is relevant to a user's interests. Out of this subset of relevant content, the content that the user is likely to engage with is considerably smaller. With the generation and proliferation of such a large amount of news content, it becomes hard for users to sift through it all and find news articles of interest. Even highly engaged users tend to dis-engage with a website when the content they are served is unappealing or not relevant to them.

This deluge of information has given rise to a challenge known as "Information Overload." Previous research has shown that variations in amount of information presented to the user, has an impact on the user's decision making process and in turn has an effect on decision quality. Prior studies have analyzed the effects of decision making by consumers in the face of information overload during the purchase of different products like CD players, peanut butter, dinner and other small and large purchases. In the digital news media domain, recommendation systems have been used to ensure delivery of content to the user in tune with their tastes. However, these systems face an unprecedented challenge—the transient nature of popular news and user's changing interests.

Recommendation systems have been popularized mostly by e-commerce websites like Amazon.com™, Netflix™, Yelp™ and other such retailers. Recommendations in the e-commerce context however, has in most cases, provided explicit feedback data of customer ratings for a particular product or comments about the product by customers, pre or post purchase. This explicit feedback data provides the recommendation engine with some notion of user likes and dislikes.

The absence of such explicit feedback by users compounds the recommendation problem in the digital news media domain. Most recommendation systems for recommending digital news content rely on inferring user engagement through clicks; which is not necessarily an accurate measure as it gives no explicit information about the degree to which a user is interested in a news article. A click on a link to an article, for example, although capable of being interpreted as an indication of a user's interest in the subject of that article, does not provide any information as to how much (e.g., a degree or level of interest, beyond merely indicating interested in or not interested in) interest the user has in the linked article.

Although there is a gross lack of explicit information about user interests, some other factors strongly influence user engagement in the news media domain. These additional factors and their combined effects on recommendation quality and user engagement are described below.

News content in the contemporary age is experiencing a shift in the publishing process wherein there is a transition from the traditional print medium to the internet. This transition has brought with it many new opportunities and has completely changed the way users receive and consume news content. One of the major changes is that online news content is dynamic in nature and near realtime. This eliminates the delay associated with printing a newspaper which, once printed, is the source of a relatively small amount of static content. This is the major allure of online content.

In an effort to deliver all the important events in the world to the users fast, news agencies typically publish a vast amount of news content on a daily basis. Vast to such a degree that sifting through all the content manually and selecting content of interest is a challenge for users. This phenomenon leads to the aforementioned "Information Overload." This serves as the primary motivation of recommendation systems for news content.

A primary goal of such recommendation systems is to gain some notion of a consumer's tastes and personalize content that the consumer sees such that it is in tune with those perceived tastes. Hence, much work has been done previously with a goal to understand user preferences and recommend content that the user might engage with.

SUMMARY OF EMBODIMENTS

A study about the performance of temporal and tag-based models for news article recommendation was carried out. Experiments indicated that incorporating temporal and user-tag information improves recommendation quality and increases user engagement. Through experimental evaluation it was determined that the improved performance is due to recommendation of more personalized news content by the tag-based recommendation models as compared to other models that do not explicitly incorporate user-tag information.

Recently there has been some work on a new approach to this problem wherein user preferences for items are inferred through their usage of tags on systems like BibSonomy™. Embodiments disclosed herein propose a novel approach for such a framework of tag-based recommendation using K-Nearest-Neighbor (KNN) based models. Data from The Washington Post™ has been used to evaluate the proposed implementations described below and perform thorough analyses thereof.

Through experiments, the effect of augmenting models with user tag profile information extracted using a latent topic model were explored. Any effective web recommendation system has to deal with users who have different activity patterns. The experiments simulated less-active users by aggressively truncating the training set size and analyzing the effect of shorter user profile sizes on recommendation quality.

Recommending news articles to users is a problem that poses a great challenge. The described exemplary implementations propose recommendation model using features that capture a user's interest for each article to obtain a subset of news content relevant to a user's interest. The problem of determining top-n content recommendation is both an information retrieval problem as well as a ranking problem in that, the relevant subset of articles once retrieved must be ranked in descending order of perceived user interest. The former problem of selecting relevant articles through a notion of user tags is addressed, and article ranking functions to aid with the latter task of suggesting top-n recommendations to the user from the list of relevant articles retrieved are proposed. An overview of the recommendation pipeline according to example implementations is described in greater detail below.

The proposed exemplary implementations according to embodiments provide tag-based recommendation systems and methods for recommending news content online. The exemplary implementations address the problem of user personalization for engaged users in order to increase user engagement, and may provide for changes in recommendation quality with change in user profile size.

Exemplary implementations use k-nearest neighbor (KNN) based temporal and tag-based models for recommending news content. In some exemplary implementations, the click behavior of users on articles is determined, and used to infer article lifetime. The inferred article lifetime may be used to quantify a notion of content-shelf life of news articles. Also, in some implementations, a temporal weighting function to rank news content based on user click behavior and article lifetime is used.

As will be understood by those skilled in the art, the exemplary embodiments of the systems and methods described herein can be implemented on a computer or server system including one or more processors, input/output, memory and display that can be interconnected via a LAN or the Internet to users' similarly configured computer equipment.

BRIEF DESCRIPTION OF THE DRAWINGS

FIG. 3 (FIGS. 3A and 3B) show instances of an example user/item matrix in accordance with some embodiments;

FIG. 4 is an example item-item similarity matrix in accordance with some embodiments;

FIG. 5 represents a user-item rating matrix with inferred values for a user inferred through item-based methods, according to some embodiments;

FIGS. 6 (6A and 6B) illustrates pseudocode for an implementation of user-KNN in accordance with some example embodiments;

FIGS. 7 (7A and 7B) illustrates pseudocode for an implementation of user time KNN in accordance with some example embodiments;

FIG. 8 illustrates pseudocode for an implementation of user-tag-KNN in accordance with some example embodiments;

FIGS. 9 (9A and 9B) illustrates pseudocode for an implementation of item-KNN in accordance with some example embodiments;

FIGS. 10 (10A and 10B) illustrates pseudocode for an implementation of item-time-KNN in accordance with some example embodiments;

FIG. 11 illustrates pseudocode for a temporal scoring function in global context in accordance with some example embodiments;

FIG. 12 illustrates pseudocode for a non-temporal scoring function in accordance with some example embodiments;

FIG. 13 illustrates pseudocode for temporal scoring function in user context in accordance with some example embodiments;

FIG. 14 illustrates pseudocode for temporal scoring function in client context in accordance with some example embodiments;

FIG. 15 illustrates pseudocode for temporal scoring function in global temporal context in accordance with some example embodiments;

FIGS. 16-17 illustrate selected exemplary data set statistics;

DETAILED DESCRIPTION

Figure 1:
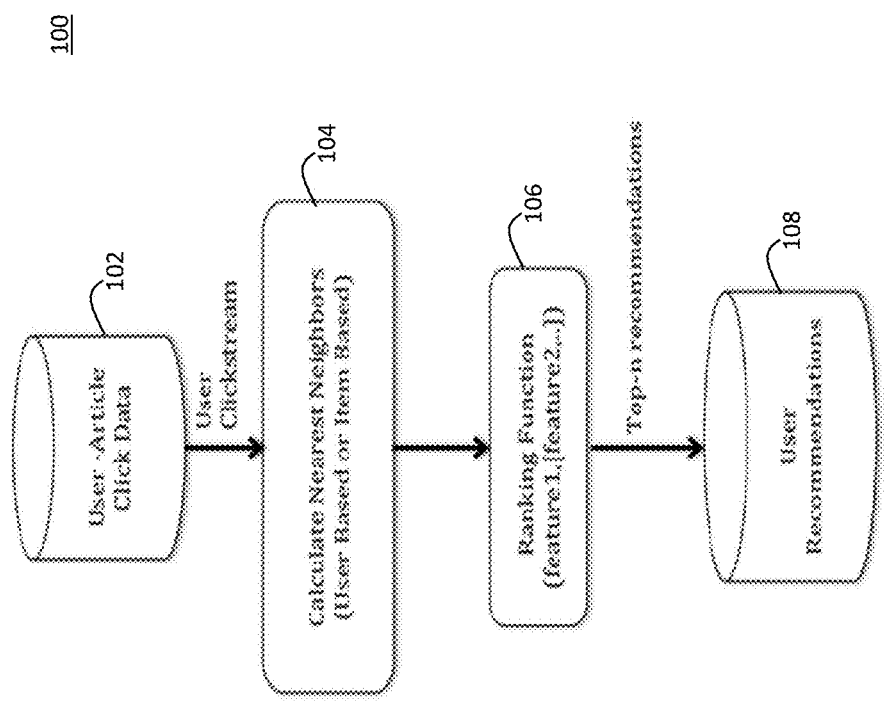
FIG. 1 is a flow chart of a top-n recommendation process used in the described exemplary embodiments.

Recommending informational content to users is, at its core, a challenging problem. A primary challenge lies in trying to infer user behavior and tastes in the current context and suggest items so that users, who many a time are themselves unsure about preferences, have a high likelihood of engagement with the suggested items. The items in question could be, for example, products on an e-commerce website, friends/followers on a social network, potential relationship companions as in the case of dating and matchmaking sites, or news articles and other news related content.

Each problem mentioned above has different challenges associated with it as each domain exists in a different context and evokes different interaction patterns from its users. For example, a friend recommendation model on a social network might have a very different set of processes used to generate recommendations as compared with a news article recommendation engine. The reason for the disparity can be attributed to the structure of the underlying domains. In the case of the social network, the user context contains their ego-network. A user's ego-network is defined as a network with the user as the focal point and all the direct connections between the focal point and other users in the network. An ego network also consists of interconnections between users in the ego-network. In the case of the news article recommendation domain, a user's profile consists of all the news articles the user previously clicked on and possibly the article metadata. Although the recommendation candidates (friends/followers) stay active on the social network for a relatively long time, news articles have a short lifespan in that their temporal-context of relevance is limited and comparatively much shorter. It is these sorts of domain-specific properties that influence and drive the need for different recommendation approaches.

The recommendation problem at a high-level may, in some exemplary embodiments, be represented as a user/item interaction matrix C. If the recommendation universe consists of m users who have collectively provided ratings or engaged in some other way with n items, then C becomes an m×n matrix of numbers where each cell represents an action of a user on a particular item. The action may be, for example, a user clicking on an item or providing a rating about the item or some other interaction between the user and the item. The domain in this case could be, for example, recommendation engines for customers of an e-commerce website, article recommendations for digital news readers, smart phone app recommendation to users who have downloaded apps in the past and numerous other settings.

Some of these settings allow users to provide feedback through ratings: e.g., product ratings on Amazon™, business ratings on Yelp™, movie ratings on Netflix™, and acceptance of news content. The settings above may be represented as $C \in R^{m \times n}$ where the interaction matrix (also referred to as rating matrix) consists of real numbers within the domain specific rating scale. These settings are termed explicit feedback recommendation.

There also exist other recommendation scenarios in which little is known about the users' preferences apart from the fact that they "engaged" with certain content. For example, news article recommendation, friend/follower recommendation on social media, social feed ranking based on likes/dislikes or tweet/retweet, and the like typically provide only that the user has interacted with a particular item. These are termed as implicit feedback recommendation settings where $C \in B^{m \times n}$.

Implicit feedback recommendation settings present many unique challenges. A major challenge is the lack of information about user dislikes in contrast to the explicit feedback case where both user likes and dislikes can be inferred from their ratings.

One popular core model or core technique used for recommendation is referred to as Collaborative Filtering (CF). In CF, the opinions of the user-universe are incorporated in making recommendations for a particular user in that universe. People constantly share opinions with each other, in planning to purchase the latest released smart phone or some other electronic product, one would be more likely to purchase the product if a few peers who already purchased the product, liked it. This credibility is established only with a subset of peers considered to have similar interests. On the other hand, one is less likely to be influenced by someone who doesn't share similar interests in electronic gadgets. This knowledge about peer-interest is gained through peers' previous purchases of electronic gadgets and the credibility of their feedback in each case.

This technique of product recommendation can be generalized and scaled from a relatively small peer group to all the users of an e-commerce site in the case of the aforementioned smartphone purchase scenario. A CF model can be used for this purpose.

Movie recommendation is one of the most canonical examples of recommendation systems in contemporary literature. FIGS. 3A-B show a scenario in which there are 4 users and 6 movies. Let the movies be denoted by column numbers 1 to 6 from left to right starting with Movie1 being denoted as column 1 and ending with Movie6 being denoted as column 6. Assume one goal in this setting is to predict the ratings user U1 will give to the unrated movies in columns 4, 5, 6 (indicated with a question mark). Based on those predicted ratings, movies that U1 is likely to rate highly can then be recommended to U1.

The movies in FIG. 3 can be divided into two broad categories of action movies (Movie1, Movie3 and Movie4) and fantasy movies (Movie5, Movie6 and Movie2). User U1 seems to have rated one fantasy movie highly while offering relatively low ratings to two action movies.

Just using user U1's rating profile (e.g., all, or a substantial portion of, ratings of a particular user till date), it may be inferred that U1 is more interested in fantasy movies than action movies, and that U1 would prefer Movie5 or Movie6 over action movie Movie4. If only one movie is to be recommended to U1, it would be desirable to recommend the movie that is inferred as the one for which U1 is most likely to offer the highest rating amongst the three unrated movies. Although the above provides for inferring high-level likes and dislikes of U1 for the unrated movies, the above technique may not be adequate to quantify what ratings U1 would give to those movies. This quantification step is important in order to select the top movie to recommend.

One way to do this would be to calculate the average rating of U1 from their previous ratings, and assign the same values to all three unrated movies. This may not be satisfactory since it does not allow for ranking the unrated movies in order of preference. It is apparent this naive approach yields low quality results as it was inferred above that the user's strong preference is for fantasy movies over action movies. Hence the user offering the same ratings to movies in both the genres is highly unlikely.

Another way to select the top movie to recommend in the above scenario is a user-based technique which compares the ratings of the other users in the system and compare their ratings with the ratings of U1. Through this "comparison" step, one may infer which users in the system are very similar to U1. The ratings of user U3 are similar to a high degree to U1 in the case of the commonly rated movies. Since U1 and U3 concur to a high degree on the common movies that they have previously rated, it can be assumed that their ratings will also agree on the movies unrated by U1. If this simple assumption is implemented, the result would be FIG. 3B which indicates that the movie recommended would be Movie6 as it has the highest inferred rating for U1.

The core assumption in the above user-based technique is that users who have had similar tastes in the past will continue to have similar tastes in the future. This assumption forms the basis of the collaborative filtering recommendation technique.

The procedure outlined above is a specific flavor of collaborative filtering termed User Based Collaborative Filtering. The example in FIGS. 3A-B may be far removed from real-world recommendation settings in which there are many more users, items and far fewer (relative to the number of users and items) explicit ratings in the matrix C. The number of users and the number of items may each be in the hundreds, thousands, millions or even larger. The number of users, items and the extreme sparsity in ratings compounds the challenge of recommendation.

Let $\{U | \text{card}(U) = m\}$ represent the user universe in an example recommendation setting. A goal would be to recommend content that $u_i \in U$ is likely to engage with. The user based collaborative filtering has four steps:
  1. Calculate user-user similarity
  2. Extract user neighborhood
  3. Form basket of potential recommendations
  4. Rank recommendations and serve top-n results.

A brief explanation of the aforementioned steps of user based collaborative filtering as applied to digital news recommendation is provided below.

In the digital news recommendation domain, $u_i$'s profile consists of all, or a substantial portion of, news articles the user clicked on/read (in the case of tag-based experiments to be introduced later, a user's profile is represented in terms of their topics of interest). The profile may be represented as a row-vector such that $u_i.\text{profile} \in B^{1 \times n}$. When calculating user-user similarity, $u_i$'s profile is compared with the profiles of all users in the set $\{U'|U'=U-\{u_i\}\}$. This may be performed through distance computations using distance metrics such as, for example, correlation, cosine, euclidean and hamming. The pearson correlation, which is a relatively popular metric used in collaborative filtering, is not recommended as it has been shown to perform poorly in implicit feedback domains. This procedure is repeated for each of the m users in U to obtain a square-symmetric matrix $U_{dist} \in R^{m \times m}$. The entry at row i, column j in $U_{dist}$ represents the profile similarity between users $u_i$ and $u_j$.

From $U_{dist}$ it is now possible to extract, for each user $u_i$, other users from the user universe that have click profiles with minimal (e.g, shortest) distance to $u_i$. This group of users with minimal profile distance to $u_i$ form the set of nearest-neighbors of $u_i$ denoted by $u_i.\text{knn}$. The size of this group is governed by a hyper-parameter that may be explicitly set and constant for the duration of the experiment. The hyper-parameter may specify a threshold distance metric or a maximum number of users to be used in determining which of the neighbors belong in the neighborhood of the user. For example, the neighborhood of user $u_i$ may include only other users whose user profiles have a similarity distance shorter than that specified by the hyper parameter, and/or the neighborhood may include the k other users whose user profiles have the shortest similarity distances to $u_i$ where the hyper parameter specifies k.

The neighborhood extraction step provides for each user $u_i$, a group of other users who have engaged with similar news content as $u_i$ in the past. The neighborhood of users $u_i.\text{knn}$ can then be used to extract the set of potential recommendations for $u_i$. The potential recommendations for $u_i$ is represented as $u_i.\text{basket}$. This basket now consists of all news articles clicked on by $u_i$'s nearest neighbors. The basket is filtered to remove any articles $u_i$ has already read.

The basket of recommendations $u_i.\text{basket}$ consists of many articles. However, only a limited number of articles may be allowed to be recommended to the user to avoid over-whelming the user with too much information. Hence, a goal is to select those articles that the user is most likely to engage with as previously discussed in the movie rating example. The recommendation ranking step is applied to this end. The ranking procedure, provides for each user $u_i \in U$, n news articles in decreasing order of inferred preference where n is a hyper-parameter dependent on the recommendation domain.

Another technique to predict the ratings of user $u_i$ for items in columns 4, 5, 6 is to consider other items that are "similar" to $u_i$'s unrated items. This technique may be referred to as an item-based technique (in contrast to the user-based technique discussed above). If each column is considered to be a vector of ratings, it can be observed that the vector of ratings representing Movie2 are relatively more similar to the vector of ratings representing Movie5 and Movie6 which once again are part of the same genre.

In this item-based technique, the item similarities are utilized as opposed to the user-similarities as done in the user-based technique described above, to infer the ratings of user U1 on columns 4, 5, 6. An item-item similarity calculation is performed wherein each column vector 1, 2, 3 is multiplied with each of column vectors 4, 5, 6 such that for each a measure of vector similarity is obtained. The similarity measure used may be, for example, cosine similarity.

$$sim(v, w) = \frac{\sum_{i=1}^{n} v_i \times w_i}{\sqrt{\sum_{i=1}^{n} v_i^2} \times \sqrt{\sum_{i=1}^{n} w_i^2}}$$

The results are shown in FIG. 4. The table shown in FIG. 4 depicts the similarities of all movies rated by U1 with all movies not rated by U1 which are the values to be inferred. For simplicity, only a subset of the entire item-item similarity matrix which would be a 6×6 matrix representing the similarity of every combination of items in the universe shown. A two-step process may now be performed to predict U1's ratings on the unrated movies.
1. For each movie v that U1 has not rated, a movie w is picked that U1 has rated such that the rating patterns across the user universe of w, match the rating patterns of v most closely. This essentially amounts to selecting for each column in FIG. 4, the row with the highest similarity value. Thus, w can be considered the nearest neighbor of v.
2. Once the nearest neighbor of v is selected, U1's rating on v is calculated as sim(v, w)×rating (U1, w) where the function rating returns the rating user U1 gave movie w and sim(v, w) signifies the cosine similarity between v and was calculated in FIG. 4.

The nearest neighbor for Movie4 is Movie1, and Movie2 is the nearest neighbor for both Movie5 and Movie6. The application of the aforementioned procedure on the rating matrix depicted in FIG. 4 yields FIG. 5. This technique is termed item-based collaborative filtering.

Let $\{U|\text{card}(U)=m\}$ represent the user universe in the recommendation setting. Let $\{I|\text{card}(I)=n\}$ represent the item universe. For a user $u_i \in U$, the goal of item-based collaborative filtering would be to recommend content that $u_i$ is likely to engage with. The item-based collaborative filtering has three steps:
1. Calculating item-item similarity
2. Form basket of potential recommendations
3. Rank recommendations and serve top-n results.

A brief explanation of the aforementioned steps of item-based collaborative filtering as applied to digital news recommendation is provided below.

Let $v_i \in I$ represent a news article and $v_i.\text{profile} \in B^{m \times 1}$ represent the click profile of the article. The click profile of a news article may consists of all, or a substantial portion of, users that clicked on the article. It may be represented as a binary vector of size m. To calculate the item-item similarity matrix $I_{dist} \in R^{n \times n}$, each pair of item click profiles may be multiplied in $C \in B^{m \times n}$ the user/item rating matrix.

In order to form the basket of potential recommendations, for each article in $u_i.\text{profile}$, the set of K-nearest neighbors of the article is obtained from $I_{dist}$. The value of the hyper-parameter K may be explicitly set prior to experimentation and remains constant throughout the experiment. Hence $u_i.\text{basket}$ consists of at most $K*\text{card}(u_i.\text{profile})$ number of items. $u_i.\text{basket}$ is filtered to discard all articles present in $u_i.\text{profile}$. That is, the filtered basket is intended to contain only articles that have not been previously read, or more specifically that have not been previously clicked on, by the user.

Each result in $u_i$.basket is ranked using features available in the recommendation context (discussed below in greater detail), and the top n results are returned to $u_i$ as article recommendations.

One of the major challenges in the news recommendation domain is that the user/item interaction matrix C is a binary matrix consisting only of user clicks on articles. A binary matrix may provide a sense of user likes, but no information can be captured regarding user dislikes as there is no notion of negative sentiment of users towards items. Also the degree to which a user likes an item they engaged with is hard to directly infer from the user/item interaction matrix. Such a setting is termed as an implicit feedback recommendation setting. Several approaches have been proposed to overcome this implicit feedback problem and provide quality recommendations.

Bayesian Personalization Ranking (BPR) is an approach that may be used to learn from implicit feedback data. Rendle et al., "*BPR: Bayesian personalized ranking from implicit feedback,*" in Proc. Twenty-Fifth Conf. on Uncertainty in Artificial Intelligence, AUAI Press. 2009, pp. 452-461, proposed BPR as a pair-wise ranking criterion. Their proposed method deals primarily with generating user-specific ranks of pairs of items. This ranking scheme has been adapted and shown to work well with the matrix factorization and k-nearest neighbor recommendation paradigm.

If U is the set of all users, I the set of all items and the interaction matrix is represented by $C \subseteq U \times I$, then the task of the recommender as defined by BPR is to provide a total ranking $>u \subset I^2$ of all items, for each user $u \in U$. BPR adapts a bayesian formulation of the problem.

$$p(\theta|>_u) \alpha p(>_u|\theta) p(\theta)$$

The goal in the above formulation is to maximize the posterior probability where $\theta$ represents the parameter vector of an arbitrary model class. The problem complexity is simplified by the assumption that all users act independently and that the ordering of each item pair for a specific user is independent of the ordering of all other item pairs.

The domain of news recommendation, in addition to the implicit feedback challenge, also has the additional complexity of the underlying item universe being highly dynamic in nature. Hence, in news recommendation, it is highly desirable to deal with new emerging pieces of content as they are gaining popularity and incorporate them into the recommendation system organically.

Li et al., "*A contextual-bandit approach to personalized news article recommendation,*" in Proc. 19th int'l conf. on world wide web, ACM 2010, pp. 661-670, proposed a multi-armed bandit based approach to address the problem of news article recommendation. A multi-armed bandit model traditionally tries to address the explore-exploit dilemma. The goal is to maximize some criterion (in this case user clicks). This is done by striking a balance between serving new articles (explore) and serving popular articles (exploit) which are guaranteed to garner more clicks. In this approach contextual information, of users and articles is used while simultaneously adapting the article selection strategy by incorporating real-time user click feedback.

Latent Dirichlet Allocation (LDA), proposed by Blei et al., "*Latent Dirichlet Allocation,*" in Jrnl of Machine Learning Research 3 (2003), pp. 993-1022, is a generative model for topic modelling of text corpora. It assumes that a text corpus is made up of individual documents and that each document is represented by a distribution of latent topics. Each latent topic is in turn a distribution of words.

A "word" is the basic unit of discrete data, defined to be an item from a vocabulary indexed by $\{1, \ldots, V\}$. Words are represented using unit-basis vectors that have a single component equal to one and all other components equal to zero. Thus, using superscripts to denote components, the with word in the vocabulary is represented by a V-vector w such that $w^v=1$ and $w^u=0$ for $u \neq v$. A "document" is a sequence of N words denoted by $w=(w_1, w_2, \ldots, w_N)$, where $w_n$ is the nth word in the sequence. A "corpus" is a collection of M documents denoted by $D=\{w_1, w_2, \ldots, w_M\}$.

FIG. 1 illustrates a flowchart of a process 100 for recommendation without the user use of news items tags. The input to process 100 includes click data 102. The click data may include stored click history and/or real-time or near real-time click information. The click information may include information regarding each user click. For example, in an embodiments deployed in a newspaper website, the click information would include at least a user id and a news item id associated with each click made by a user on a link of the newspaper website. In some embodiments, additional information, such as, for example, the timestamp of the click may be included.

According to some embodiments, at operation 104, click data 102 is obtained. The nearest neighbors for user $u_i$ is determined using a technique such as user-based collaborative filtering or an item-based collaborative filtering. User-based collaborative filtering and item-based collaborative filtering techniques are described above, and below in relation to the pseudocode shown in FIGS. 6-15. A basket of candidate news item recommendations are selected based upon the determined set of nearest neighbors. In the user-based techniques, first the nearest neighbor users are determined using a technique such as KNN based upon user click profiles, and then the basket of candidate recommendations are selected from news items clicked on by the nearest neighbor users. In the item-based techniques, the nearest neighbors of the items clicked on by user $u_i$ may be determined according to a technique described above and/or described below in relation to pseudocode shown in FIGS. 6-15.

The candidate items are then ranked at operation 206, and a predetermined number of the highest (e.g., best) ranked candidates are returned as the recommendation(s). A ranking to a particular news item in the candidate items, according to embodiments, may be assigned based upon news item popularity as well as upon temporal aspects of that news item. The temporal aspects of the news item may be determined based upon user clicks on that news item. FIGS. 11 and 13-15 describe some techniques used in embodiments for temporal scoring.

The predetermined number of the best candidate news items are then determined based upon the scored news items. The best candidate items may, at operation 108, be stored in a memory for subsequent, or may be returned to a querying entity. For example, upon a particular user logging in or accessing a news portal web site, the above operations 104-108 may be performed by a processor, and one or more recommendations of news items may be presented to the user on the web page as suggestions for reading.

Figure 2:
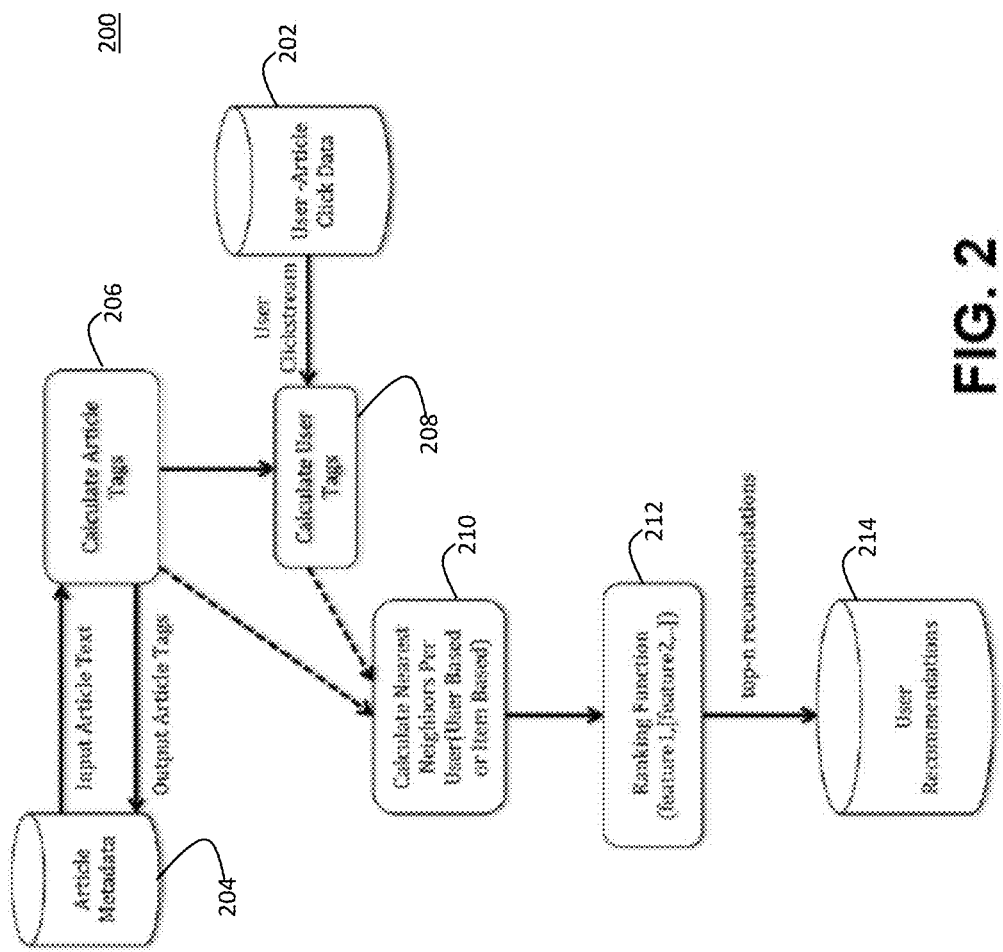
FIG. 2 is a flow chart of a top-n recommendation process using tag based recommendation models used in the described exemplary embodiments.

FIG. 2 illustrates a flowchart of a process 200 for recommendation that also utilizes article metadata for making recommendations. Process 200 utilizes user-article click data 202 that may be similar to the click data 102. Additionally, process 200 may also utilize article metadata 204. Article metadata may include, for each article that has been previously published, one or more of the article, key words, key phrases, author information, subject categorization, when published, web sites where published, etc.

In the process 200, at operation 206 tags are calculated for each news item (e.g., article) based upon the corresponding metadata in data store 204. The tags may be based upon any piece of information stored, a combination of pieces of information stored, and/or a term or phrase derived from that which is stored. For each news item a vector of tags may be formed.

At operation 208, for each user, the applicable tag vectors are gathered based upon the news items included in the corresponding user profile. For example, for a particular user having x news items that have been previously clicked on by the user included in his user profile, the tag vectors of each of the x news items may be aggregated for the particular user at operation 208.

At operation 210, the nearest neighbors are determined, based upon user-based techniques or item-based techniques. The processing may be similar to processing described in relation to operation 104 described above.

At operation 212 the top-n recommendations are determined. The processing at operation 212 may be performed in a similar manner to that described in relation to operation 106 described above. At operation 214, using processing similar to that described in relation to operation 108 described above, the recommendations are output.

In the description of the pseudocode below the following definitions may be used: n is the number of items or unique pieces of news content in the recommendation universe; m is the number of users in the recommendation universe; C represents the user-item binary click matrix; U list of all users in the recommendation universe; $U_{dist}$ is the user-user distance matrix; $I_{dist}$ is the item-item distance matrix; P is a vector that represents the number of clicks per item; Γ is the matrix of timestamps of each user click on each item; $Γ_{user}$ is a vector storing the time of last click of each user; $Γ_{item}$ is a vector storing the time of last click on each item; γ represents the timestamp of the latest click in the data set; μ is a parameter that controls the distance metric used; β is a parameter that controls the number of recommendations to serve to a user; α is a parameter that controls the number of neighbors selected during KNN process; $u_{irecs}$ a list of β recommendations for user $u_i$; and Ω is the number of topics used by LDA to model a corpus of articles.

The result of the LDA process is the tagging of each document in the corpus with a k dimensional latent topic vector $z∈R^{k×1}$ such that the topic vectors for similar documents are similar.

The distance metric used to determine neighborhoods is another metric that is important in recommendation systems. The quality of a K-Nearest Neighbor model can be significantly influenced by the distance metric used. Example embodiments may utilize a distance metric such as, for example, correlation distance, cosine distance, euclidean distance or hamming distance.

Four separate distance metrics may be employed to evaluate the quality of results and select the best performing model.

If two vectors u and v of length n are considered, the distance metrics are represented as follows.

1. Correlation Distance:

$$\text{correlation}(u, v) = 1 - \frac{(u - \bar{u}) \cdot (v - \bar{v})}{\|u - \bar{u}\|_2 \times \|v - \bar{v}\|_2}$$

1. Cosine Distance:

$$\text{cosine}(u, v) = 1 - \frac{\sum_{i=1}^{n} (u_i \times v_i)}{\sqrt{\sum_{i=1}^{n} (u_i)^2} \times \sqrt{\sum_{i=1}^{n} (v_i)^2}}$$

4. Euclidean Distance:

$$\text{euclidean}(u, v) = \sqrt{\sum_{i=1}^{n} (u_i - v_i)^2}$$

5. Hamming Distance:

$$\text{hamming}(u, v) = \frac{\sum_{i=1}^{n} (eq(u_i, v_i))}{n}$$

The hamming distance between two vectors u and v of length n is the number of entries that disagree between the two vectors. 'eq' represents a function that takes two numbers as parameters and returns 1 if they are equal and 0 if they are unequal.

Every popular website has a loyal user base of highly engaged and active users that regularly subscribe to and consume its services. While most of the focus is on expanding this base of loyal users through content recommendation, yet another challenging problem is to increase engagement of the current set of active users through content personalization. The primary focus of the example implementations lies in addressing the latter challenge of developing personalization models to recommend content to loyal users and to further increase engagement with the website.

The primary focus, while taking into account content recommendation for highly active users is to identify their current interests amongst all their many clicks on different types of content. As noted above, unlike most other recommendation domains, the news domain has a highly dynamic content space. Hence, different aspects need to be considered while making recommendations as compared to other domains like movie recommendation (e.g., Netflix™), e-commerce product recommendation (e.g., Amazon.com™), restaurant/place of business recommendation (e.g., Yelp™), where the item lifetimes are relatively longer and the entire product space is not prone to very radical changes. News articles quickly become stale, new developments to a particular story give rise to fresh news articles which should (ideally) be preferred over the old news story about the same topic. Only a small subset of relatively popular news articles receive a significant number of clicks, and the lack of explicit user sentiment (as is present in rating based recommendation systems) in addition to implicit click feedback makes it hard to get a clear picture of a user's tastes so as to distinguish the content a user likes from content disliked.

In example embodiments, these challenges are addressed using temporal and tag (e.g., topic) based recommendation techniques which recommend fresh content to a user, deemed relevant to their current interests.

Example embodiments may be configured to use one or both of two broad approaches to article recommendation. The first set of techniques are based on a user-based nearest neighbor approach and the second set of techniques are based on an item-based nearest neighbor approach. User-based techniques and item-based techniques were briefly described above, and are further described below in relation to their use in example embodiments. In example embodiments, both these approaches are extended with different features from the input data that take into account article life times and user profile to make the recommendations.

FIG. 6A illustrates pseudo-code for a user KNN technique based on users' click profile. Each user's clicks are represented as a binary row-vector in $B^{1 \times n}$ where n is the number of items in the universe. The binary click matrix C is used to calculate a user-user similarity matrix $U_{dist}$ using the specified distance metric μ and in turn extract a user's nearest neighbors based on the calculated similarity values (it should be noted that the metrics used in the described examples for "similarity value" may be considered dissimilarity (specifically distance) metrics, but other metrics too are contemplated in embodiments). If a user $u_i$ from the universe U of users is considered, recommendations for user $u_i$ may be generated based on the procedures in FIG. 6A and FIG. 6B. For each user $u_i$ in U, the getNN function retrieves a users whose click profile distances to $u_i$.profile are shorter relative to other users. The list returned by getNN consists of a ranked (in order of distance, for example, click profile distance) list of nearest neighbors of user $u_i$'s profile. This list is then passed to the gather function. The gather function has two steps; first, all articles clicked on by each of $u_i$'s nearest neighbors are accumulated and articles that $u_i$ has clicked on are filtered out (e.g., usings recs.difference function) from this list. The list now consists of articles that are completely unexplored by $u_i$. The second step involves the ranking function wherein the scoreC function ranks each article by popularity. For each article, its popularity may be based upon the number of users who have clicked on that article. The top β most popular articles are then returned back to the user. In example implementations, the set difference operation difference is invoked on 'recs' and 'C[$u_i$]' which are lists, but, for clarity of illustration, in FIG. 6B it is assumed that they are lists of unique items (sets).

FIG. 7 illustrates pseudocode for User Time KNN techniques in which the above described User KNN techniques are extended by adopting a time based ranking procedure for the recommendations. The User Time KNN method is very similar to the User KNN method, and a primary difference lies in the recommendation ranking procedure adopted. The User Time KNN techniques is shown in FIG. 7A and FIG. 7B. FIG. 11 shows a temporal scoring that can be used in User Time KNN techniques.

Example embodiments may be configured to use any of the example temporal scoring functions described below that generate a temporal news content popularity score. Each of the three scoring functions takes into account a different facet of the temporal context of article recommendation and the problem is addressed from the perspective of the global temporal context, the nearest-neighbors' temporal context and the client's (i.e., the user for whom recommendations are generated is termed as the client) temporal context. The temporal ranking functions are as depicted in FIGS. 11, 13-15.

In the User Time KNN technique, the nearest neighbors are selected based the distance between user click profiles using the $U_{dist}$ matrix. In some embodiments this selection may be solely based on the distance between user click profiles. The α closest users to a particular client $u_i$ for whom recommendations are being generated are selected, and the clicks (e.g., articles and corresponding click information) of those closest users (neighbors) are passed onto the scoring function. These form the set of potential recommendations for $u_i$. Each of these items is then assigned a score which is calculated as a product of an exponential temporal decay function and the observed aggregated number of clicks on the item as shown in FIG. 11.

The items are then sorted in decreasing order of score and the first β items are returned as recommendations for $u_i$. Taking into account temporal features has the effect of accounting for article freshness which may be crucial in the domain of news recommendation. Popular articles might garner a significant number of clicks post-publish, but most such news articles are still relevant only for a few days, and sometimes only for a few hours. Incorporating the temporal weighting of clicks alleviates the 'rich get richer effect' which may lead to recommending only popular articles solely based on clicks even though they might be far from relevant during the time of recommendation.

Example embodiments employing tag-based recommendation techniques use tags specified by users to build a model and quantify user tastes. These may be referred to as User Tag KNN techniques. In the corpus of news articles used for the example embodiments, there may be no explicit notion of tags similar to sites like Bibsonomy. In the absence of user-provided tags, topic-tags for users may be inferred by aggregating the topic vectors of the items on which the users have clicked previously. In example embodiments, these item topic vectors may be generated using a technique such as, for example, LDA on the article text corpus. LDA allows all articles to be represented in a common topic-space $\Omega \in R$. Aggregating the topic vectors of articles in a user's click profile to generate the user's tag-vector has the effect of allowing us to represent user click profiles in the same latent space as articles. It provides a more granular view of user tastes as compared to binary user click vectors previously considered to calculate the user-profile distance matrix $U_{dist}$.

The pseudocode for generating the recommendations according to User Tag KNN techniques is described in FIG. 8 and FIG. 6B. The difference in this case occurs in the generation of the user click profile matrix which is now instead modelled using topic-vectors of the user's clicks. $U_{tag} \in R^{m \times \Omega}$ represents the matrix of user topic profiles where each row in $U_{tag}$ represents the tag-profile of a single user in latent topic space. The User Tag KNN method uses the non-temporal scoring function scoreC represented in FIG. 12.

Example embodiments utilizing Temporal Tag User KNN model incorporates temporal information in ranking recommendations from the pool of potential recommendations generated using the click profiles of the nearest neighbors. When recommendations are being made for a particular user $u_i$, the user's nearest neighbors are inferred similar to the Tag User KNN techniques above by calculating distance between $u_i$'s tag vector and tag vectors of all other users in the universe using a distance metric μ. The recommendations are then scored and sorted according to one of the temporal scoring functions outlined in the above techniques. This approach of using tag-based features to generate user recommendations has advantages over the purely temporal or purely collaborative models. Similarity calculations performed using latent topic vectors to select nearest neighbors are more accurate than using binary click vectors to obtain similarity because binary click vectors fail to recognize users who have similar tastes if they have no overlapping articles. The requirement for significant overlap in click profiles is counter-intuitive to the collaborative filtering process as the very foundation of such techniques is to identify users who have common interests and recommend to a user, articles that his neighbors have read that the user hasn't. Hence requiring significant overlap between user click profiles to obtain quality results defeats the purpose of user-based collaborative filtering models. A practical problem faced in real-world recommendation datasets is the inherent sparsity in the data. Every user reads just a small subset of articles present in the universe. Hence a technique that depends on co-occurring article views between users will always under-perform compared to a technique that is able to infer user profile similarity even in the case where a pair of user's have no article views in common. The procedure of User Time-Tag KNN is described by FIG. 8 and FIG. 7B.

In example embodiments using item-based KNN techniques, once again the K-nearest neighbor approach based on users' click profiles is adopted. An n×n square symmetric matrix $I_{dist}$ representing item-item click profile distances is calculated using the specified distance function µ. A transpose of the user/item click matrix $C^t$ is used to calculate the item-item similarities. The process of recommendation using the Item KNN procedure has been outlined in FIGS. 9A and 9B.

Each user's clicks are represented as a binary row-vector in $B^{1 \times n}$ where n is the number of items in the universe. For a particular user $u_i$, the click profile is denoted as $u_i$.profile. For each article a in $u_i$.profile, we retrieve the top α articles that have click profiles most similar to a in increasing order of distance, from the item-item distance matrix $I_{dist}$. The getNN function in this case returns a list of articles instead of user nearest neighbors as in the User KNN technique. This list of articles is passed to the gather function wherein the non-temporal scoring function scoreC is applied and the top β results are returned to the user.

The Item Time KNN technique employed in some example embodiments is based on a similar procedure as described above in relation to Item KNN. In Item Time KNN however a new temporal function scoreT (shown in FIG. 11) is used to rank recommendations. The scoreT function for each article a, takes into account the temporal difference between the global latest click timestamp (e.g., to approximate the current temporal context) and the time of last click on a, stored in $\Gamma_{item[a.idx]}$, where a.idx is the index of a. This gives a direct notion of article freshness as explained previously. The procedure is outlined by FIGS. 10A, 10B and 11.

The example embodiments using tag-based Item-KNN techniques are very similar to the Item KNN techniques described above except in this case, $Itag \in R^{n \times \Omega}$ is used to generate the item-item distance matrix $I_{dist}$. The tag-based procedure and advantages were described above, and item tag KNN introduces the notion of tags. In example embodiments, all tags are generated for items (e.g., articles) using the text metadata of the articles. However, in some embodiments, tags generated using other techniques and/or tags assigned by users may also be used.

Some example embodiment use an Item Time KNN technique. The Item Time KNN is identical to the procedure outlined in relation to item time KNN except that Itag which is the item tag matrix is used in place of the transposed user/item click matrix $C^t$ to generate the item-item distance matrix $I_{dist}$. In this case also the scoreT temporal function is used for temporal weighting of tag-based recommendations.

Several scoring functions are used in example embodiments to weight and rank recommendations which in turn determine the user's final recommended articles.

Figure 18:
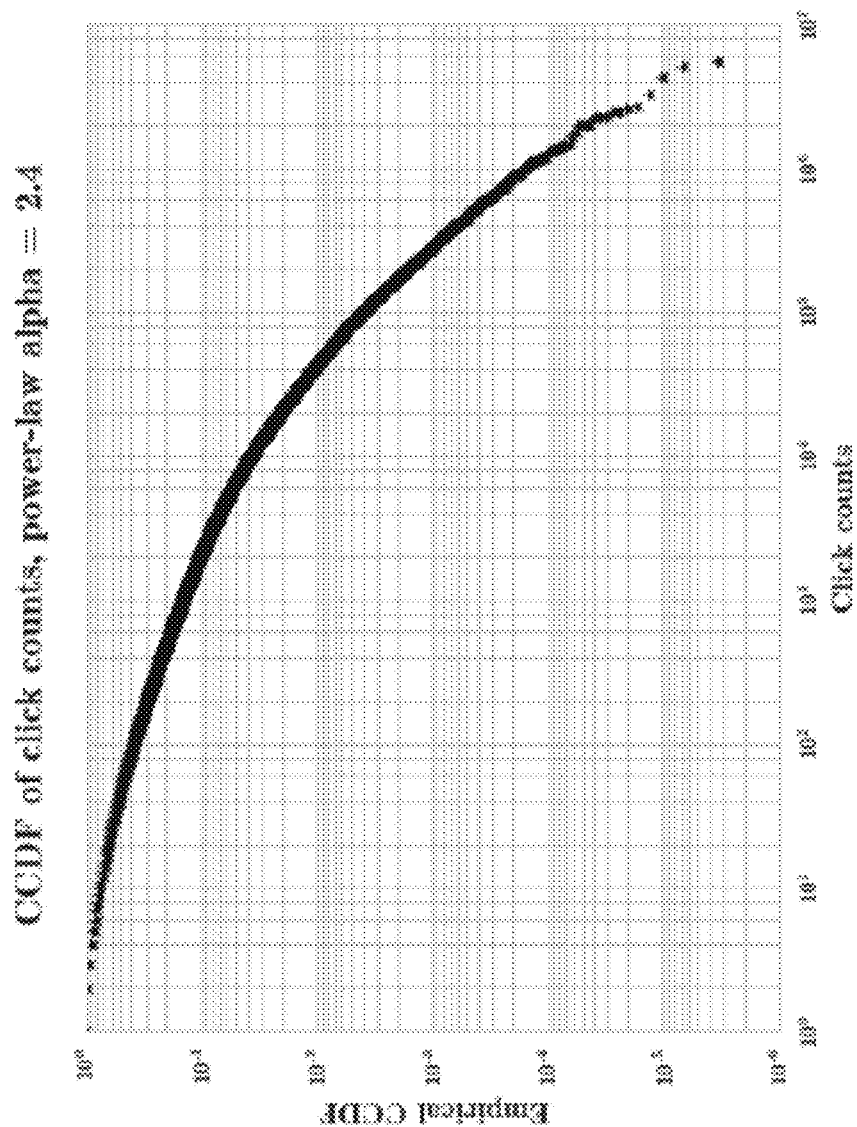
FIG. 18 is a graphical representation of article popularity (measured as number of clicks in the article) according to an example dataset.

The score collaborative ("scoreC") function, the pseudo-code for which is shown in FIG. 12, weights recommendations by item popularity. It is important to note the distinct advantages and disadvantages of this notion of scoring purely by item popularity. Article popularity (measured as number of clicks on the article) varies drastically across the universe of articles and adheres to a power-law distribution as indicated by FIG. 18 (This figure represents the empirical CCDF of article clicks on a large article dataset, which is representative of the general click behavior of users on the Washington Post dataset). Less than 0.01% of the items have greater than $10^5$ clicks. Ranking solely by article clicks in such scenarios has the effect of recommending highly clicked articles only. As a result such models miss out completely the user personalization aspect of recommendation and tend to recommend only the globally popular articles. Although article popularity is extremely important, it needs to be contextually scaled according to some criterion in order to address the problems described above.

ScoreT_User is another scoring technique employed in example embodiments. A user $u_i \in U$ has a set of nearest neighbors $u_{i_{nn}}$. Each article α, gathered for potential recommendation may have at least three parts to its context: the user-id of the nearest neighbor whose click profile the article was recommended from denoted by a.nn_idx; the time of click of the nearest neighbor on the article $\Gamma_{[a.nn\_idx][a.idx]}$; and the overall popularity of the article, $P_{[a.idx]}$.

For some article a in $u_i$.basket, $\Gamma_{user[a.nn\_idx]}$ represents the timestamp of the most recent click of the nearest neighbor with id a.nn_idx. Here, an exponential decay function of the difference between $\Gamma_{[a.nn\_idx]}$ and $\Gamma_{[a.nn\_idx][a.idx]}$ may be considered. This difference in timestamp essentially considers how far into the past a particular user in $u_{i_{nn}}$ (e.g., any user in the nearest neighbors of $u_i$) clicked on an article a relative to their time of latest click. Since each user in $u_{i_{nn}}$ has article reading behavior quite similar to any article that one of $u_i$'s nearest neighbors has read might be relevant to $u_i$'s interests. But it may be incorrect to assume that all of $u_i$'s nearest neighbors read the same number of articles or that they have the same activity pattern. Some users might read a few news articles a day but others might read news articles on a more intermittent basis. Hence this scoring function measures the elapsed time per user in $u_{i_{nn}}$ between their time of click on a particular article and their most recently read article. So even if a user has not read news articles for two days, since the article read two days ago by the user was their most recent click, the article would not be penalized excessively by the temporal weighting function. The scorerT_User is shown in FIG. 13.

Similar to the ScoreT_User function, the ScoreT_Client function in some example embodiments also takes into account a user specific click time for temporal weighting. But in this case the temporal weighting function considers the difference between the time of $\Gamma_{[a.nn\_idx][a.idx]}$ and $\Gamma_{user[u_i.idx]}$ where $u_i$ is the user for whom the recommendations are being generated (also referred to as the client), and $u_i$.idx is the user-id of the client. Although the ScoreT_User function accounts for users with different activity patterns in temporal weighting of recommendations, it fails to take into account the activity pattern of the client in question. This problem is addressed by the ScoreT_Client function which for each article in $u_i$.basket, penalizes the article based on how far in the past the article a was clicked on by user a.nn_idx relative to $u_i$'s time of latest click (an approximation of $u_i$'s current temporal context). ScoreT_Client pseudocode is shown in FIG. 14.

Although it might be prudent to consider the different activity patterns of nearest neighbors while ranking recommendations, it is equally important to consider how recently the client has been on the site. This is because if a client has been on the site very recently, there are chances that they have already seen the older articles that might be recommended as a result of their more inactive but very similar nearest neighbors by the ScoreT_User function. So if the client already saw the article and it was not present in $u_i$.profile, it means they might not be interested in the content and hence did not click on it. Conversely, if the client has not read any news articles for a few days, this function would allow all articles the client has not read in the past few days, a fair shot in the ranking and not just the recent articles. Thus the ScoreT_Client function recommends content more temporally relevant to the client's temporal context.

Score Temporal Global function, ScoreT_Global, used in some example embodiments and shown in pseudocode in FIG. 15, employs an exponential decay function of the difference between $\Gamma_{[a.n\_idx][a.idx]}$ and the global latest click represented by $\gamma$. The difference between these two times gives us a measure of article temporal-freshness in the current global temporal context. Weighting article popularity with temporal freshness addresses the problem of scaling article popularity and improves recommendation ranking by giving articles that have been recently popular and evoked user reading interest, while also offering newer articles a level playing field to compete with their more popular predecessors. An exponential decay function has been chosen (instead of other functions like linear decay etc.) to model article lifetime due to general article lifetime trends following a power-law distribution as observed in FIG. 18.

Some example embodiments employ a sliding window technique incorporated within its recommendation selection process. The sliding window model of computation is motivated by the assumption that, in data-stream processing applications, recent data is more useful and pertinent than older data, hence we only use a recent subset of the available data. The size of the subset of data used is called sliding window size which might be defined by various time units. In the embodiment described, it is defined as the number of days used for the article corpus considered for recommendations. All preferences of a user that occur before the start of the sliding window are not considered for recommendation computation. In some example embodiments, the sliding window size may be varied between 5-30 days in 5 day increments to obtain six sets of experiments (5, 10, 15, 20, 25 and 30 day sliding window).

In each case, the sliding window size represents the number of contiguous calendar days of data used to train the recommendation models and the subsequent calendar day of data is always used for testing. For example, if the sliding window size is set to 5 days and the start date is January 28th, then the data from the 28th of January to the 1st of February will be used for training the model and the performance is evaluated using data from the 2nd of February.

All experiments were run on a dataset consisting of clickstream data between January and March of the user subset.

In order to demonstrate consistent performance of example embodiments, implementations across each month of the year were evaluated conducting 12 experiments in total. All data in a month excluding the last calendar day was is used for training the models and the last day of data is used for testing (since some months have less than 31 days, the last day of clicks is left out for testing. Also, some months had only 29 or 27 days of training data which was compensated for by incorporating 1 or 3 days of click data, respectively, from the previous month to maintain consistency) the performance of the recommendation model.

Figure 20A:
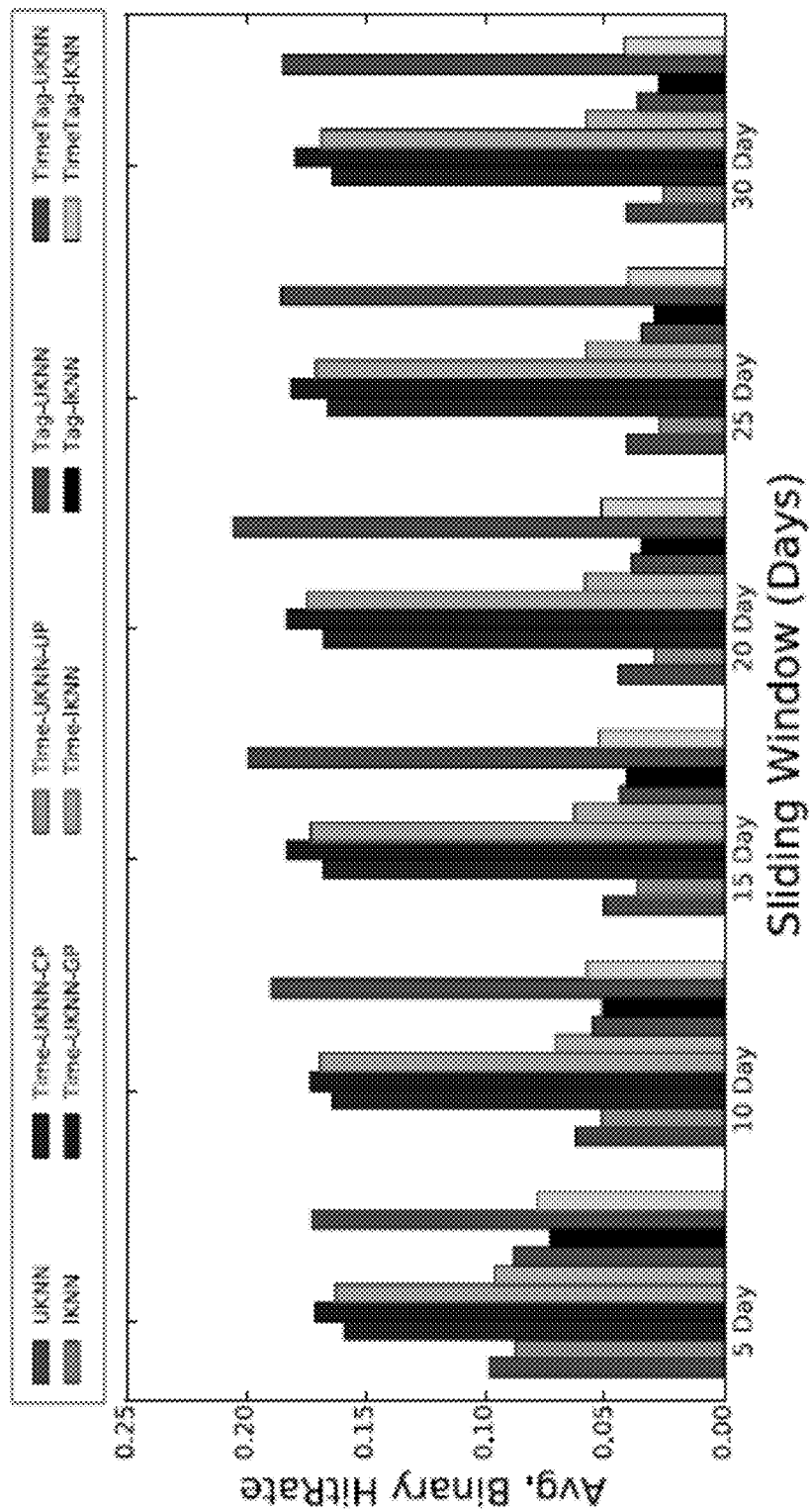
FIG. 20A is a bar graph depiction of average binary hit rate versus sliding window (in days) for some example recommendation models.
Figure 20B:
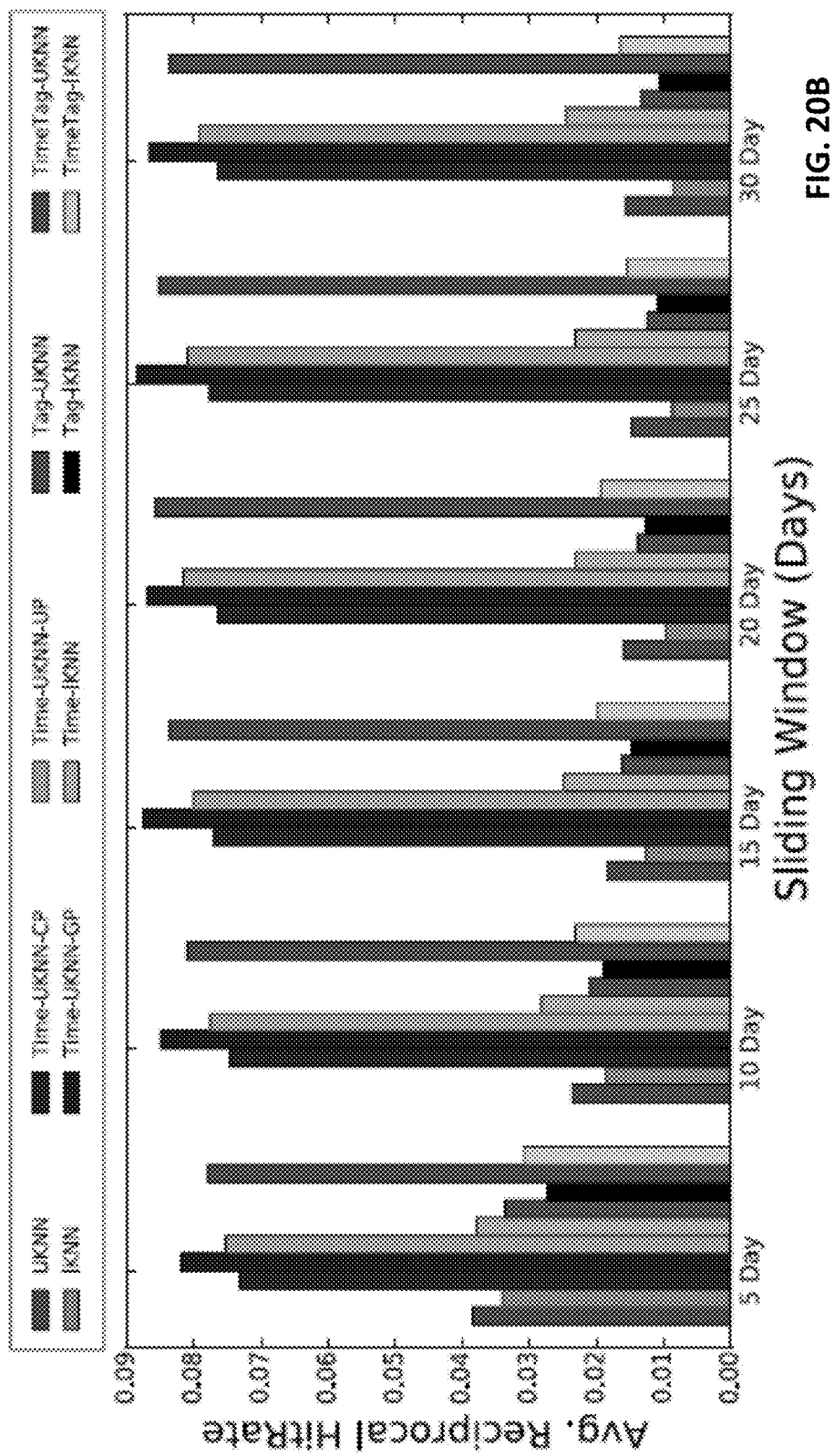
FIG. 20B is a bar graph depiction of average reciprocal hit rate versus sliding window (in days) for various recommendation models.
Figure 20C:
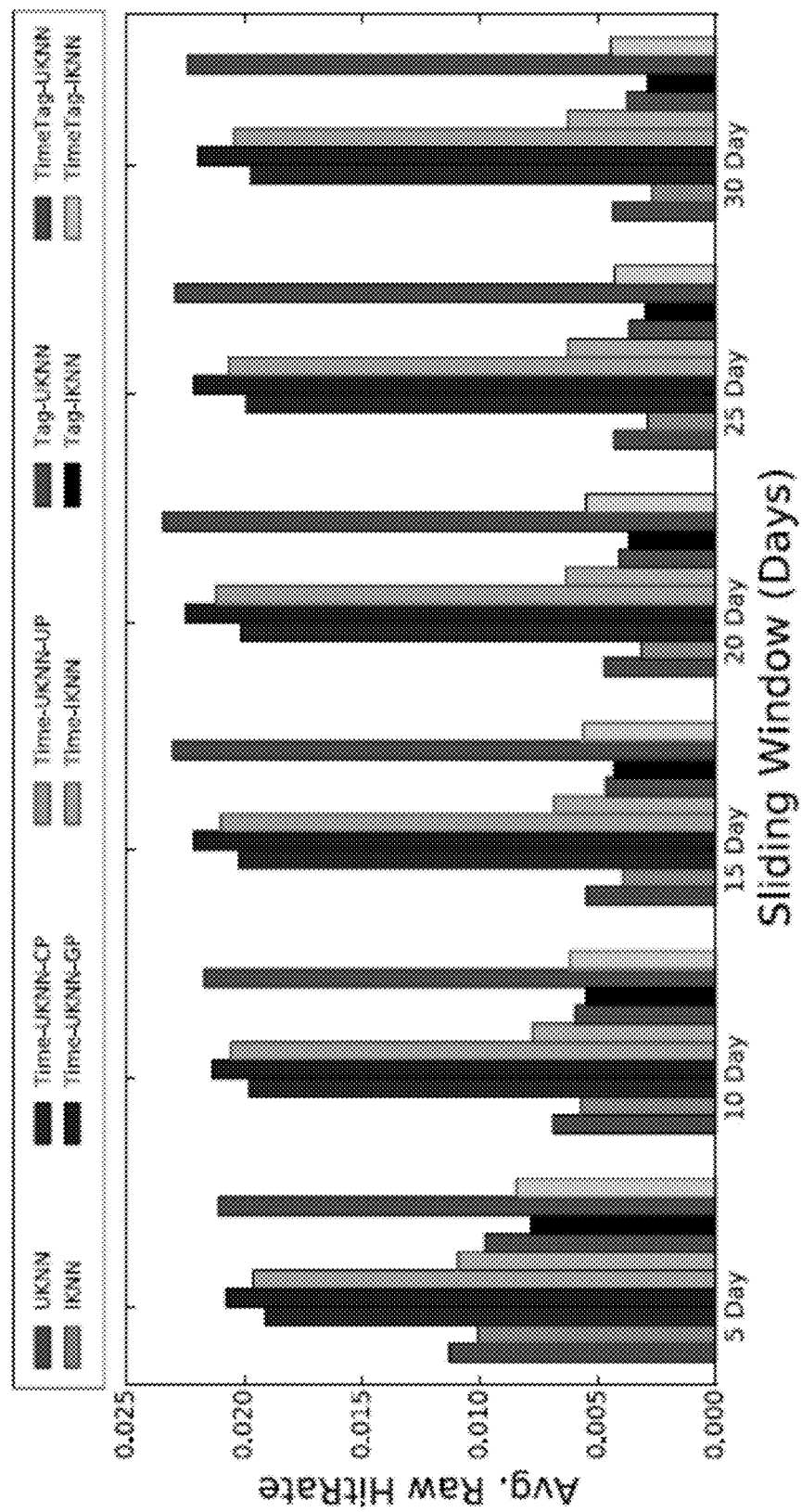
FIG. 20C is a bar graph depiction of average raw hit rate versus sliding window (in days) for various recommendation models.

FIG. 16 shows a significant difference in the user-profile lengths (Avg. User Clicks column) and item pool sizes (Avg. #Items column) across the various experiments. A significant difference can be observed in performances of the recommendation models across the various sliding window experiments (see FIGS. 20A-C) and this can be attributed to the difference in the user profile lengths and the item universe size (unique news content in the time period). Each of the columns listed in FIG. 16 has an effect on recommendation quality. These effects are discussed below.

Figure 19:
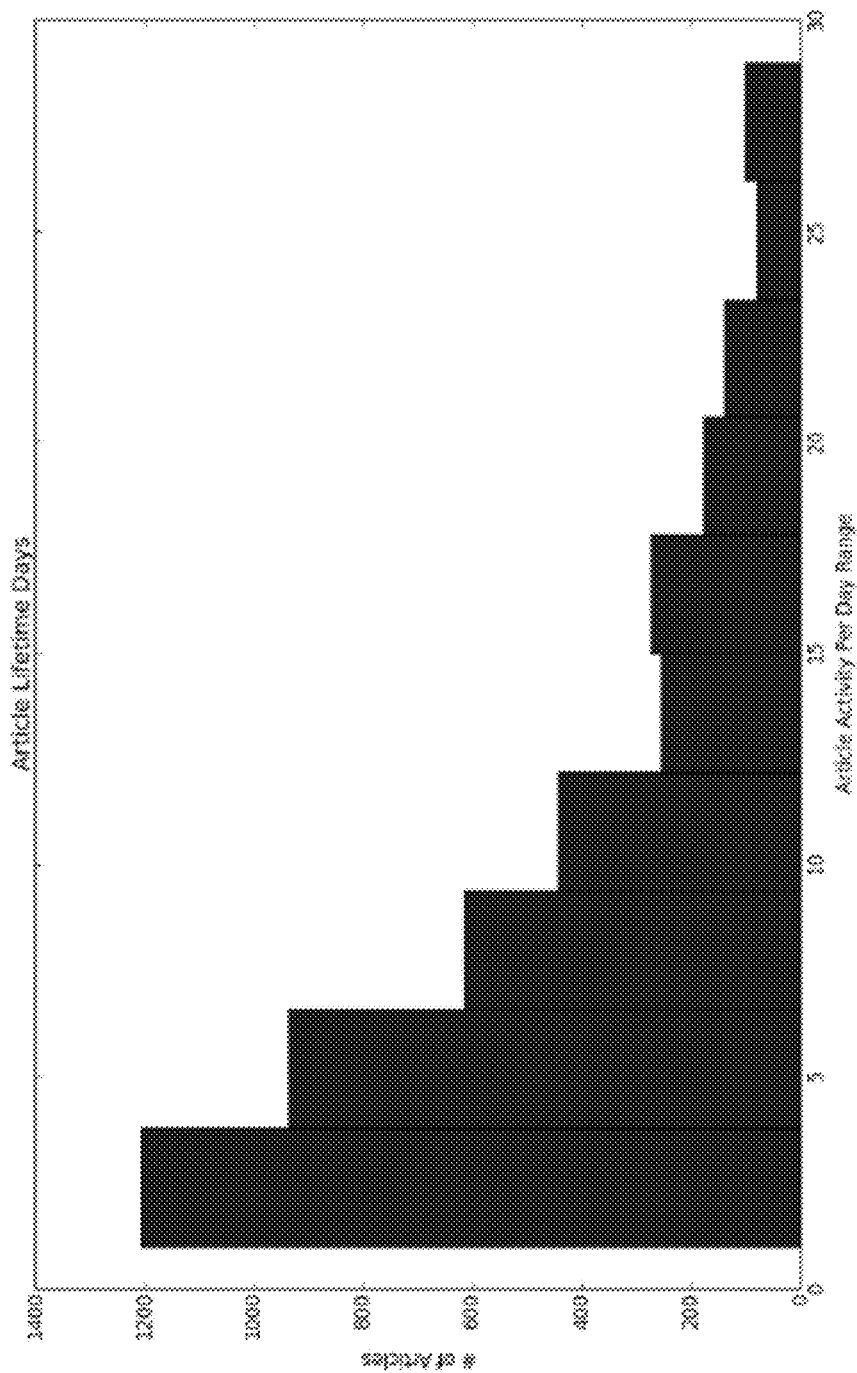
FIG. 19 is a bar graph depicting article lifetime according to an example dataset.

The dataset for monthly experimental evaluation consisted of clicks segregated by month, of a randomly sampled set of about ten thousand active users in that month. The dataset consists of all clicks on news article and news blog pages each month by the selected set of users. The monthly dataset statistics are as listed in FIG. 17. The dataset density column is especially of interest, as it highlights the sparse nature of the problem at hand. Although the most dense dataset (December) has about 5% density, the content lifetimes (period of time for which news articles are relevant and of interest to users) are fairly short lived (see FIG. 19) which poses a greater challenge to the recommendation models. FIG. 19 captures the average number of days after being published that an article is viewed at least by one user in the dataset. FIG. 19 indicates that a majority of articles in the set last no more than 5 days post-publish. The values depicted are the average values across all the months of data.

The recommendation quality is measured by Binary HitRate and Average Reciprocal HitRate. Binary HitRate is defined as:

$$BihHR = \frac{\#hits}{\#users}$$

Here #hits measures the number of users who have clicked at least one recommendation from the Size-N recommendation list suggested to them. #users represents the total number of users that recommendations were produced for.

$$ARHR = \frac{1}{\#users} \sum_{i=1}^{n} \frac{1}{p_i}$$

ARHR (Average Reciprocal HitRate) is primarily a measure concerned with recommendation ranking when considered along with Binary HitRate. Each hit in ARHR is inversely weighted relative to its position pi in the top-N recommendation list so that more weight is assigned to hits when a user clicks an article that is ranked higher in the recommendation list. The Binary HitRate and Average Reciprocal HitRate were chosen as measures of evaluation as opposed to metrics like area under the ROC curve (AUC) because in the case of AUC, measurement is of the relative positions of true and false positives from the entire ranked list of items in the universe. In real-world scenarios, it is more important to measure the performance (clicks and relative positioning) of the much smaller subset of items that are actually recommended to the user.

Experiments were conducted using 10 separate recommendation techniques on 6 different sets of sliding window experiments. See FIGS. 20A-C. These techniques were: User KNN (UKNN)—KNN with recommendations sorted by article popularity; Temporal User KNN Global Temporal Scoring (UKNN_GP)—KNN with recommendations sorted by global temporal scoring function; Temporal User KNN User Temporal Scoring (UKNN_UP)—KNN with recommendations sorted by user temporal scoring function; User Temporal KNN Client Temporal Scoring (UKNN_CP)—KNN with recommendations sorted by client temporal scoring function; Tag User KNN (Tag-UKNN)—User Tag Matrix used in KNN calculation with recommendations sorted by popularity; Temporal Tag User KNN (TimeTag-UKNN)—Tag Matrix used in KNN calculation with recommendations sorted by global temporal scoring function; Item KNN (IKNN)—KNN with recommendations sorted by article popularity; Temporal Item Global Scoring (TimeIKNN)—KNN with recommendations sorted by global temporal scoring function; Tag Item KNN (TagIKNN)—Item Tag Matrix used in KNN calculation with recommendations sorted by article popularity; and Temporal Tag Item KNN Global Scoring (TimeTagIKNN)—Item Tag Matrix used in KNN calculation with recommendations sorted by global temporal scoring function.

Based upon the experiments described above, the example embodiments including TimeTag-UKNN techniques which take into account user interests at a more granular level than the non-tag based models were found to have the most advantageous performance.

The embodiments described above improve upon the relevance and accuracy of recommendations provided to a user of an electronic recommendation system. BY improving the relevance and accuracy of the recommendations provided to the user, the example embodiments may also improve the performance efficiency of the recommendation computer system itself by enabling it to handle more requests from different users for recommendations in a given time interval. For example, instead of providing multiple less accurate recommendations to a particular user and having that user in a lengthy interaction with the system to narrow down a recommendation, the embodiments' more accurate and more relevant recommendations reduce the frequency with which the same user would engage in a drawn-out exchange with the system to narrow down a recommendation.

Example embodiments address problems posed by news gathering and distribution based on extensive, highly connected, and high speed computer networks. It is expected that embodiments can advantageously utilize the click information of large numbers of users who are geographically distributed. The click information of numerous distributed users may be communicated, using the current or future communication networks, almost instantaneously to users attempting to obtain recommendations, thereby ensuring that the provided recommendations are selected based on the latest most up to the minute feedback.

It will be appreciated that as used herein, the terms system, subsystem, service, logic circuitry, and the like may be implemented as any suitable combination of software, hardware, firmware, and/or the like. It also will be appreciated that the storage device locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium. For example, instructions for implementing the recommendation processes shown in FIGS. 1-2, and processes corresponding to the pseudocode of FIGS. 6-15 may be performed by executing such instructions by the processor. The tables, lists and/or other data structures corresponding to the information structures shown in FIGS. 3-5 may be stored in a memory.

Figure 21:
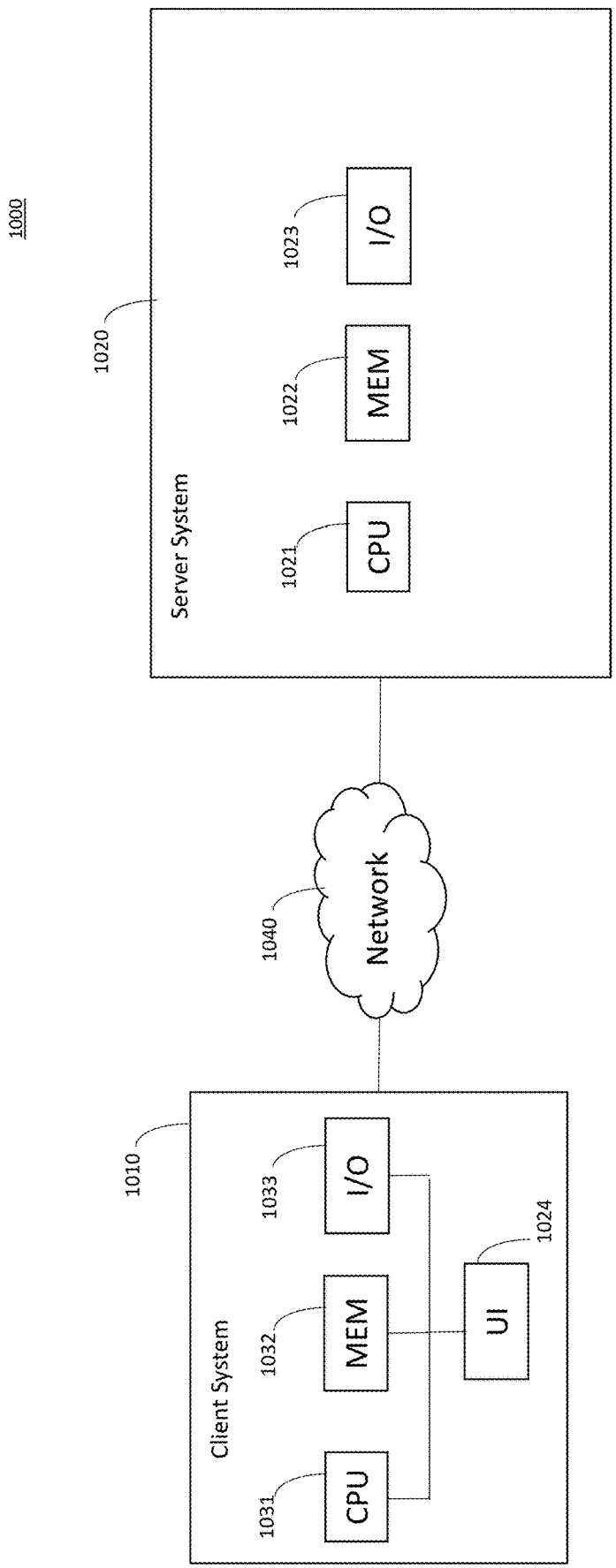
FIG. 21 schematically illustrates a computer system in which embodiments can be implemented.

FIG. 21 illustrates an example computer system 2100 that may be used for implementing one or more of the example embodiments. The computer system 2100 may include a server system 2120 and a client system 2110 interconnected by a network 2140. The server system includes at least a processor 2121, a memory 2122 and input/output 2123. The client system includes a processor 2111, a memory 2112, input/output 2113, and a user interface 2114. In some embodiments, the processing corresponding to FIGS. 1-2 and 6-15 may be performed on a processor 2121 of a server system 2120. Click data may be collected from a user who interacts, using a user interface 2114 of a client device 2110.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

What is claimed is:

1. A computer system for providing news item recommendations, the system comprising:
  one or more digital memories having stored therein metadata for a plurality of news items and click data corresponding to user reading interactions with the plurality of news items, the interactions comprising interactions by a plurality of users;
  at least one processor configured to:
    receive a request for a news item recommendation for a user;
    determine one or more tags for each of the plurality of news items, each of the one or more tags being derived from a topic or a content of a corresponding news item;
    determine a first user profile for the user, the first user profile including indications of news items previously clicked on for reading by the user in the form of a first n-element binary vector having a corresponding bit position set for each news item read by the user, n being a total number of news items;
    determine a respective second user profile for each of a plurality of other users, each respective second user profile including indications of news items previously clicked on for reading by said each other user in the form of a plurality of second n-element binary vectors each having a corresponding bit position set for each news item read by said each other user;

determine a first tag vector for the user, the first tag vector comprising an aggregation of the determined one or more tags for each news item indicated as read by the user in the first n-element binary vector;

determine a respective second tag vector for each of the plurality of other users, the respective second tag vector comprising an aggregation of the determined one or more tags for each news item indicated as read by said each other user in the second n-element binary vector corresponding to said each other user;

identify one or more nearest neighbors from the plurality of other users based upon respective similarity distances of respective said other users to the user, the similarity distances to the user being determined using said first tag vector and the plurality of second tag vectors;

select candidate news items for recommendation from news items indicated in the second user profiles that correspond to the identified one or more nearest neighbors;

score the selected candidate news items using, at least in part, a volume of the click data and a temporal aspect of the candidate news items; and in response to the request, output a predetermined number of recommended news items based upon a ranking of the scored candidate news items.

2. The computer system of claim 1, wherein the click data includes an aggregate number of clicks for each of the plurality of news items, and wherein the using the click data in the scoring includes adjusting a score for a news item based upon a current value of the news item's aggregate number of clicks.

3. The computer system of claim 2, wherein the current value of the news item's aggregate number of clicks is determined based upon an exponential decay function associated with the news item's aggregate number of clicks.

4. The computer system of claim 2, wherein the click data includes a time of last detected click for each of the plurality of news items, and wherein the click data provides for associating, for a particular news item from the plurality of news items, another user whose user profile caused the particular news item to be selected into said candidate news items, and a time of click of said another user on the particular news item, wherein the scoring includes adjusting a score for a news item based upon at least the time of click of said another user on the news item.

5. The computer system of claim 4, wherein the scoring includes adjusting the score based on how far back in time said another user clicked on an article a relative to said another user's time of latest click.

6. The computer system of claim 4, wherein the scoring includes adjusting the score based on how far back in time said another user clicked on an article a relative to time of latest click by the user.

7. The computer system of claim 4, wherein the scoring includes adjusting the score based on how far back in time said another user clicked on an article a relative to a time of latest click.

8. The computer system of claim 4, wherein said another user is selected based upon a nearest neighbor technique based upon a comparison of news items previously clicked on by respective other users as recorded in respective user profiles, wherein each user profile is represented as a one dimensional vector of indications of news items previously clicked on by a user.

9. The computer system of claim 1, wherein said selecting includes selecting only news items on which another user has clicked more recently than a configured threshold amount of elapsed time.

10. The computer system of claim 1, wherein the user profile includes for each news item included in the user profile an aggregate of said tags associated with the news item, and wherein the selecting candidate news items for recommendation is from news items included in other user profiles that are identified based upon their respective similarity distances to the user profile.

11. A computer implemented method for providing news item recommendations, executed using at least one processor of a server having one or more digital memories storing therein metadata for a plurality of news items and click data corresponding to user reading interactions with the plurality of news items, the user reading interactions comprising interactions by a plurality of users, the method comprising:

receiving a request for a news item recommendation for a user;

determining one or more tags for each of the plurality of news items, each of the one or more tags being derived from a topic or a content of a corresponding news item;

determining a first user profile for the user, the first user profile including indications of news items previously clicked on for reading by the user in the form of a first n-element binary vector having a corresponding bit position set for each news item read by the user, n being a total number of news items;

determine a respective second user profile for each of a plurality of other users, each respective second user profile including indications of news items previously clicked on for reading by said each other user in the form of a plurality of second n-element binary vectors each having a corresponding bit position set for each news item read by said each other user;

determine a first tag vector for the user, the first tag vector comprising an aggregation of the determined one or more tags for each news item indicated as read by the user in the first n-element binary vector;

determine a respective second tag vector for each of the plurality of other users, the respective second tag vector comprising an aggregation of the determined one or more tags for each news item indicated as read by said each other user in the second n-element binary vector corresponding to said each other user;

identify one or more nearest neighbors from the plurality of other users based upon their respective similarity distances of respective said other users to the user, the similarity distances being determined using said first tag vector and the plurality of second tag vectors;

selecting candidate news items for recommendation from news items indicated in the second user profiles that correspond to the identified one or more nearest neighbors;

scoring the selected candidate news items using, at least in part, a volume of said click data and a temporal aspect of the candidate news items; and outputting a predetermined number of recommended news items based upon a ranking of the scored candidate news items.

12. The computer implemented method according to claim 11, wherein the click data includes an aggregate number of clicks for each said news item, and wherein the scoring includes adjusting a score for a news item based upon a current value of the news item's aggregate number of clicks.

\* \* \* \* \*